(12) United States Patent　　　(10) Patent No.:　US 12,586,232 B2

Hassbring et al.　　　　　　　　(45) Date of Patent:　　Mar. 24, 2026

(54) METHOD FOR OBJECT DETECTION USING CROPPED IMAGES

(71) Applicant: Axis AB, Lund (SE)

(72) Inventors: Ludvig Hassbring, Lund (SE); Song Yuan, Lund (SE)

(73) Assignee: Axis AB, Lund (SE)

( * ) Notice: Subject to any disclaimer, the term of this patent is extended or adjusted under 35 U.S.C. 154(b) by 360 days.

(21) Appl. No.: 18/333,890

(22) Filed: Jun. 13, 2023

(65) Prior Publication Data

US 2023/0410352 A1　　Dec. 21, 2023

(51) Int. Cl.
| | |
|---|---|
| *G06T 7/70* | (2017.01) |
| *G06T 3/40* | (2024.01) |
| *G06T 7/11* | (2017.01) |
| *G06T 7/20* | (2017.01) |
| *G06V 10/26* | (2022.01) |
| *G06V 10/776* | (2022.01) |

(52) U.S. Cl.
CPC .................. G06T 7/70 (2017.01); G06T 3/40 (2013.01); G06T 7/20 (2013.01); G06T *2207/20084* (2013.01); *G06T 2207/20132* (2013.01); *G06V 2201/07* (2022.01)

(58) Field of Classification Search
CPC .... G06T 7/70; G06T 3/40; G06T 7/20; G06T 2207/20084; G06T 2207/20132; G06T 3/4053; G06T 7/11; G06T 2207/10016; G06T 2207/30196; G06T 2207/30232; G06T 5/20; G06V 2201/07; G06V 20/625; G06V 10/26; G06V 10/776; G06V 40/10; G06V 10/82; G06V 20/52; G06V 20/40; G06V 10/84; G06V 40/103; G06V 40/20; G06V 2201/08; G06N 3/045

See application file for complete search history.

(56) References Cited

U.S. PATENT DOCUMENTS

| | | | |
|---|---|---|---|
| 2017/0220816 A1* | 8/2017 | Matusek ................ | G06V 10/25 |
| 2018/0268240 A1* | 9/2018 | Loce ................... | G06V 10/764 |
| 2019/0042860 A1 | 2/2019 | Lee et al. | |
| 2020/0334448 A1* | 10/2020 | Ghazaryan ............. | G06V 10/82 |
| 2020/0364481 A1 | 11/2020 | Kornienko et al. | |
| 2021/0150192 A1* | 5/2021 | Han ......................... | G06N 3/09 |
| 2021/0201049 A1 | 7/2021 | Su et al. | |
| 2022/0138493 A1* | 5/2022 | Lee ......................... | G06T 7/254 |
| | | | 382/103 |
| 2023/0249712 A1* | 8/2023 | Chen ...................... | G06V 20/58 |
| | | | 701/26 |

* cited by examiner

*Primary Examiner* — Amandeep Saini
*Assistant Examiner* — Andrew S Budisalich
(74) *Attorney, Agent, or Firm* — Volpe Koenig

(57) ABSTRACT

A method and control unit for object detection in a video stream captured with an image acquisition device, especially for the purpose of anonymizing objects in the video stream.

14 Claims, 8 Drawing Sheets

METHOD FOR OBJECT DETECTION USING CROPPED IMAGES

FIELD OF INVENTION

The present invention generally relates to the field of camera surveillance, and in particular to a method and control unit for object detection in a video stream captured with an image acquisition device, for example for the purpose of anonymizing objects in the video stream.

TECHNICAL BACKGROUND

In various camera surveillance applications, it is sometimes necessary to mask objects in a video stream captured by a camera. Important reasons for object masking are to ensure privacy for people that are present in the video stream and to protect other types of personal information that may be captured in the video stream.

Masking of the people may be performed by extracting the image coordinates of the relevant parts of an image frame. Once the image coordinates are known, the relevant parts in the video stream can be masked, pixelated, blurred, or in other ways modified to obscure identifiers in the video stream. However, before masking can be processed the object to be masked must be detected in the video stream. Object detection methods may be applied for detecting for example people.

Object detection requires algorithms such as run by neural networks to detect and classify objects in the video stream. To allow for the neural network to operate sufficiently fast the neural network may have to operate at a lower resolution than the camera. This results in a loss of data since it requires downscaling of the images. Further, the reduced resolution may lead to that the neural networks is not able to accurately detect an object that should be masked, which consequently means that an operator may be able to see the object by digital zooming in the image.

Accordingly, there is room for improvements with regards to object detection, in particular for anonymizing objects in a video stream.

SUMMARY

In view of above-mentioned and other drawbacks of the prior art, it is an object of the present disclosure to provide an improved method for object detection in an image that alleviates at least some of the drawbacks of prior art.

According to a first aspect of the present disclosure, it is therefore provided a method for object detection in an image. The method comprises obtaining first resolution image acquired by an image acquisition device; scaling the first resolution image to a second resolution image with lower resolution than the resolution of the first resolution image; analyzing the second resolution image to determine a first probability that a detected object of a predetermined type is present in an area of the first resolution image, if the first probability is below a first threshold and above or equal to a second threshold, cropping the area including the detected object in the first resolution image, where probabilities exceeding or equal to the first threshold indicate that a detected object is of the predetermined type and probabilities below the second threshold indicate that a detected object is not of the predetermined type, analyzing the cropped image to determine a second probability that the detected object is of the predetermined type, and if the second probability exceeds or is equal to the first threshold, providing an indication that the detected object is of the predetermined type.

The present disclosure is based upon the realization to utilize image cropping to increase the accuracy in object detection. More specifically, the inventors realized that if the first probability is such that it cannot be known if the area in the downscaled or scaled image includes an object of the predetermined type, the area in the original image acquire by the image acquisition device is cropped so that the cropped image can be analyzed, or more specifically run through a neural network again for object detection. This provides for detection objects with higher accuracy.

A video stream is generally a set of consecutive image frames captured over time. The consecutive image frames collectively form the video stream.

The present disclosure may be applied to various applications where object detection is used. One such application is for privacy masking which is understood as a feature to protect personal privacy by hiding or concealing parts of an image frame with a masked area. Generally, a privacy mask may be static or dynamic, where the one that will be most discussed herein are dynamic masks. Privacy masks include for example edge filters, solid masks, or blurring. A static mask may be applied globally in the same way across an entire or at least part of an image frame whereas a dynamic mask may be applied once for example a face or person is detected in the video stream.

Scaling an image may be considered downscaling with the objective to reduce the image resolution to a resolution suitable for the analyzing step for detecting an object. For example, the first image may be downscaled to a second resolution suitable for an algorithm or neural network used for object detection.

According to an embodiment, the steps of analyzing the second resolution image and analyzing the cropped image may be performed in a neural network. The neural network is operable at a resolution typically lower than the sensor. The scaling step is intended to adapt the image resolution to the neural network operation image resolution. In other words, the neural network may be adapted to an image resolution and image size and expects input images to have that resolution and size. This is required in order to enable to operation of neural network in real-time for object detection.

According to an embodiment, the step of analyzing the second resolution image may be performed in a first neural network and the step of analyzing the cropped image may be performed in a second neural network. Using more than one neural network advantageously enables for running the object detection method faster.

According to an embodiment, the method may comprise: (a) analyzing the cropped image to determine a further probability that a detected object of the predetermined type is present in an area of the cropped image, (b) if the further probability is below the first threshold and above or equal to the second threshold, cropping the area of the detected object in the cropped image to form a further cropped image, (c) analyzing the further cropped image to determine a still further probability that the detected object is of the predetermined type, and (d) if the still further probability exceeds or is equal to the first threshold, providing an indication that the detected object is of the predetermined type, wherein the steps (a)-(d) are recursively performed until a predetermined condition is fulfilled. Thus, if the analysis still cannot confidently conclude the type of object, a further image cropping is performed on a smaller area. By recursively analyzing and cropping, object detection accuracy is further improved.

The recursively performed method may continue until at least one of several conditions is fulfilled: the further probability in step (b) is below the second threshold or exceeds or is equal to the first threshold; for a predetermined number of iterations; and if a resolution of the further cropped image is below a predetermined resolution. The predetermined resolution may for example be a resolution the neural network used for analyzing the cropped image is adapted for. Further, if a further probability in step (b) is below the second threshold or exceeds or is equal to the first threshold there is no "detection uncertainty" and there is therefore no need to continue with a further recursive iteration.

According to an embodiment, the step of analyzing the first resolution image may comprise to determine probabilities that detected objects of the predetermined type is present in more than one area, where more than one respective area is cropped in the first resolution image and analyzed. Thus, it is envisaged to crop more than one area to advantageously detect more than one object.

According to an embodiment, the method may comprise analyzing a set of second resolution images, detecting motion in the set of second resolution images, and if the detected motion exceeds or is equal to a motion threshold, cropping a further area in a subsequent image frame, analyzing the cropped image, and, if the second probability exceeds or is equal to the first threshold, providing an indication that the detected object is of the predetermined type. Advantageously, a new crop is only performed on the areas where motion is detected with some magnitude exceeding or being equal to a motion threshold, thereby reducing the time required for taking new crops. In other words, only taking new crops where motion is detected. The further area preferably includes the area of a moving detected object that was detected in the set of second resolution images. Detection and quantifying motion may be performed by monitoring pixel color variations in the images, to mention one possible implementation.

Further, if the detected motion is below the motion threshold in a first image frame, the outcome of the analyzing step in a first frame may be reused on the same cropped area in a subsequent image frame. Thus, instead of performing a new crop and analyzing an area again where it may not be needed, i.e., where no motion is detected, the prior analysis result is reused.

According to an embodiment, if the first probability exceeds or is equal to the first threshold, providing an indication that the detected object is of the predetermined type. The indication may further include an indication that object masking is required.

Preferably, the resolution of the first resolution image is as captured by the image capturing device.

The resolution of the second resolution image advantageously depends on a size of a neural network used for analyzing the second resolution image.

Preferably, the method is performed at a rate substantially corresponding to the frame rate of a captured video stream including the first resolution image.

According to a second aspect of the present disclosure, there is provided a control unit for object detection in an image, the control unit is configured to: obtain first resolution image acquired by an image acquisition device; scale the first resolution image to a second resolution image with lower resolution than the resolution of the first resolution image; analyze the second resolution image to determine a first probability that a detected object of a predetermined type is present in an area of the first resolution image, if the first probability is below a first threshold and above or equal to a second threshold, crop the area including the detected object in the first resolution image, where probabilities exceeding or equal to the first threshold indicate that a detected object is of the predetermined type and probabilities below the second threshold indicate that a detected object is not of the predetermined type, analyze the cropped image to determine a second probability that the detected object is of the predetermined type, and, if the second probability exceeds or is equal to the first threshold, provide an indication that the detected object is of the predetermined type.

Further embodiments of, and effects obtained through this second aspect of the present disclosure are largely analogous to those described above for the first aspect of the disclosure.

According to a third aspect of the present disclosure, there is provided a system comprising a control unit according to the second aspect and an image acquisition device for capturing images of a scene including objects.

The image acquisition device is preferably a video camera such as a surveillance camera.

Further embodiments of, and effects obtained through this third aspect of the present disclosure are largely analogous to those described above for the first aspect and the second aspect of the disclosure.

According to a fourth aspect of the present disclosure, there is provided a computer program for object detection in an image, the computer program comprising computer code which, when run on processing circuitry of a controller causes the control unit to: obtain first resolution image acquired by an image acquisition device; scale the first resolution image to a second resolution image with lower resolution than the resolution of the first resolution image; analyze the second resolution image to determine a first probability that a detected object of a predetermined type is present in an area of the first resolution image, if the first probability is below a first threshold and above or equal to a second threshold, crop the area including the detected object in the first resolution image, where probabilities exceeding or equal to the first threshold indicate that a detected object is of the predetermined type and probabilities below the second threshold indicate that a detected object is not of the predetermined type, analyze the cropped image to determine a second probability that the detected object is of the predetermined type, and if the second probability exceeds or is equal to the first threshold, provide an indication that the detected object is of the predetermined type.

Further embodiments of, and effects obtained through this fourth aspect of the present disclosure are largely analogous to those described above for the other aspects of the disclosure.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the disclosure, including its particular features and advantages, will be readily understood from the following detailed description and the accompanying drawings, in which.

DETAILED DESCRIPTION

Figure 1:
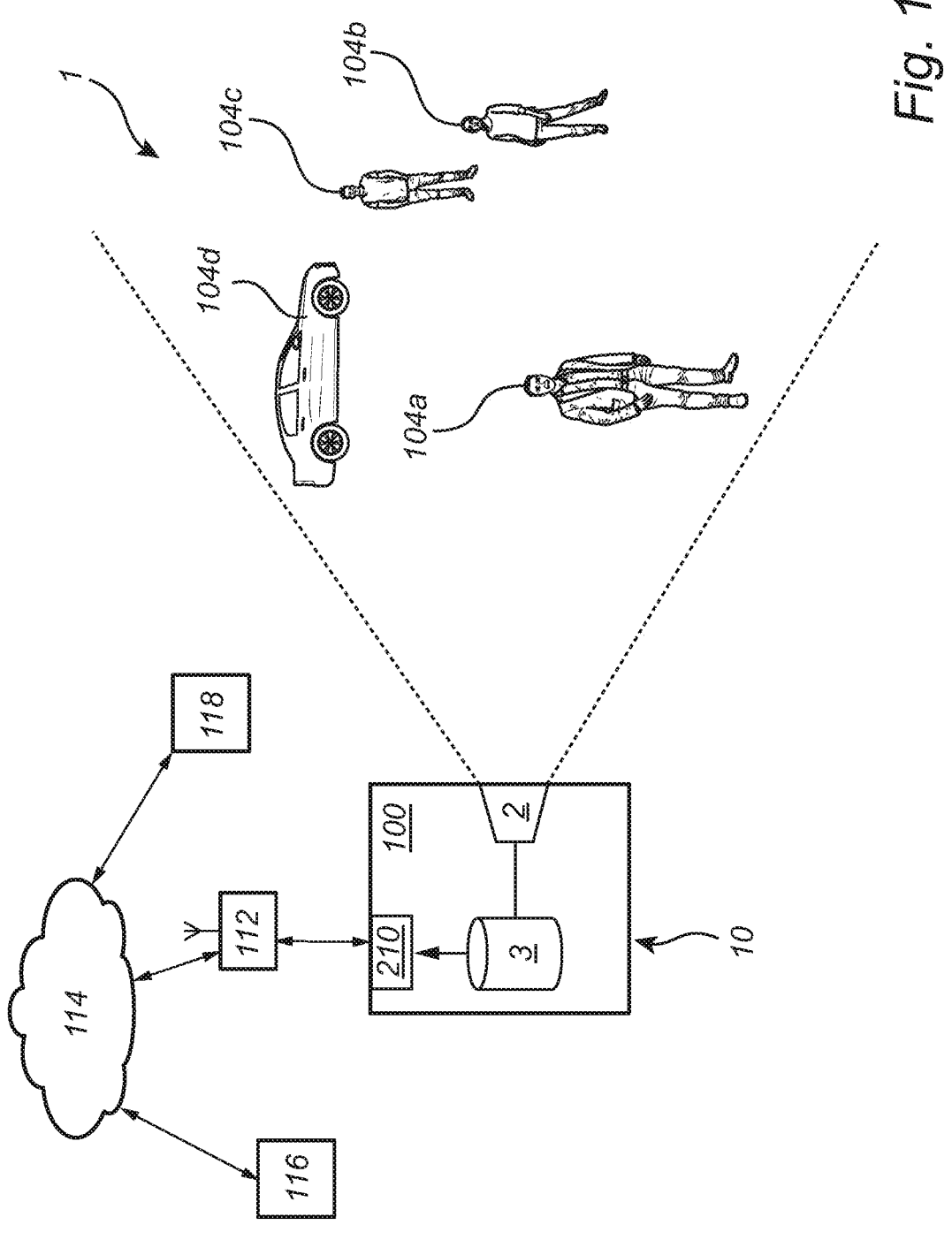
FIG. 1 conceptually illustrates an example application of embodiments of the disclosure.

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled person. Like reference characters refer to like elements throughout.

Turning now to the drawings and to FIG. 1 in particular, there is shown a scene 1 being monitored by an image acquisition device 100, e.g., a camera or more specifically a surveillance camera. In the scene 1, there is a set of objects 104*a-d*, that may be for example a vehicle 104*d* in a parking lot, and a number of people 104*a-c*.

The camera 100 may be mounted on a building, on a pole, or in any other suitable position depending on the specific application at hand. Further the camera 100 may be a fixed camera or a movable camera such as pan, tilt and zoom, or even a body worn camera. Further, the camera 100 may be a visible light camera, an infrared (IR) sensitive camera or a thermal (long-wavelength infrared (LWIR)) camera. Further, image acquisition devices employing LIDAR and radar functionalities may also be conceivable.

The camera 100 is continuously monitoring the scene 1 by capturing image frames forming a video stream of the scene 1. The scene 1 that is within the field of view of the camera 100 is here exemplified as including the vehicle 104*d* and people 104*a-c*. The camera 100 may transmit the video stream over a communication link 112, hardwired or wireless, connected to a communication network 114, e.g., the Cloud, to a client 116 or a server 118.

The camera 100 comprises an image capturing module 2, and a control unit 3 comprising one or more processors capable of operating an image processing pipeline and an encoder. The camera 100 further comprises an input and output interface 210 configured as a communication interface between the camera 100 and the network 114 via the radio link 112.

During monitoring of the scene 1 with the camera 100, the control unit 3 is operable to detect objects in the scene and to classify them as being of a certain type. Detecting objects in the scene 1 is important since it may be used for masking of objects and people to protect their privacy. To improve the ability for the camera and its associated control unit 3 to detect objects of a predetermined type, for example, objects in need of masking, the following method is provided.

Figure 2:
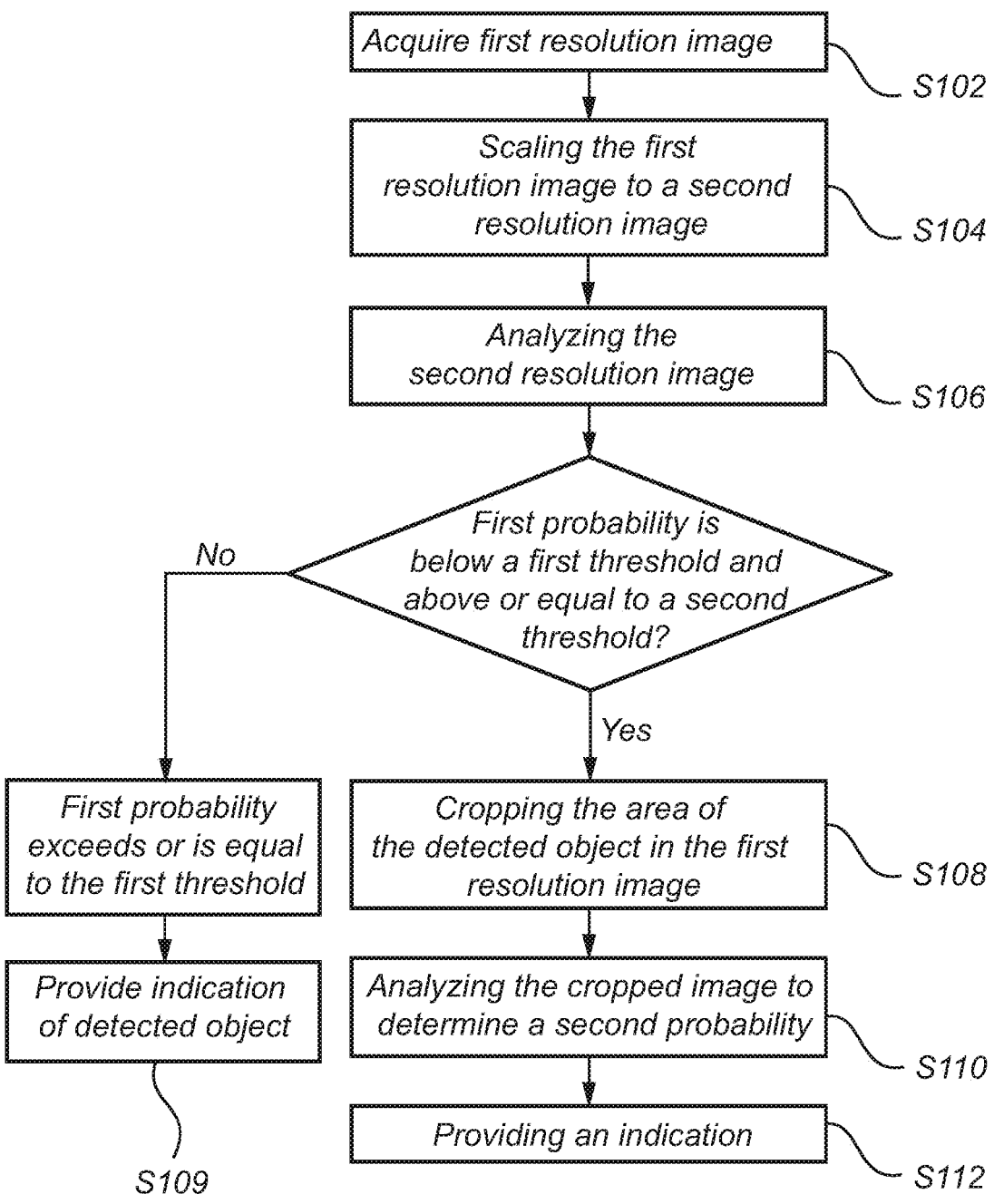
FIG. 2 is a flow-chart of method steps according to embodiments of the disclosure.
Figure 3:
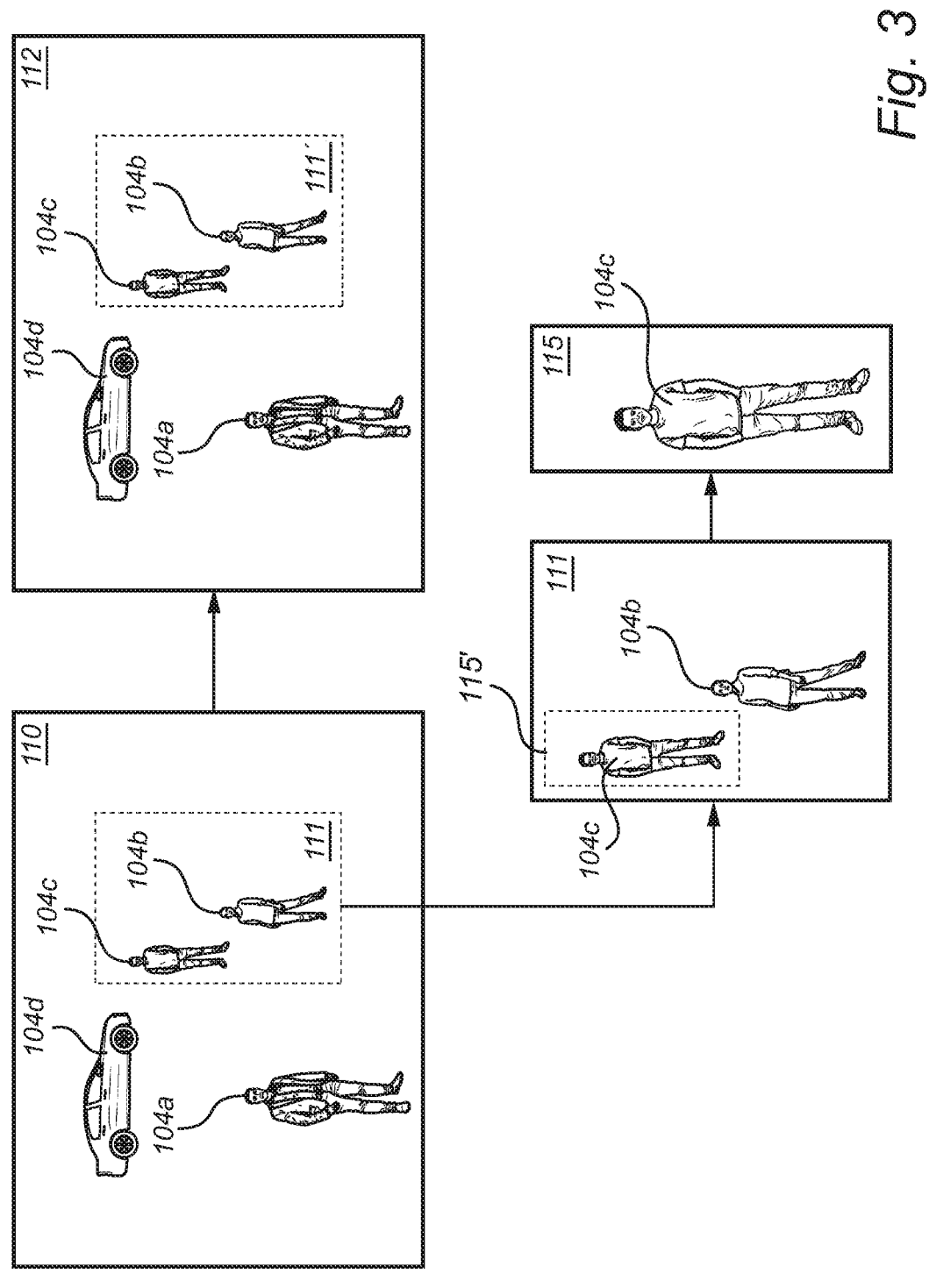
FIG. 3 conceptually illustrates an image cropping process for object detection according to embodiments of the disclosure.

FIG. 2 is a flow-chart of method steps according to embodiments of the present disclosure and FIG. 3 conceptually illustrates steps of the method.

In step S102, a first resolution image 110 is acquired by an image acquisition device 100. The first resolution image 110 may be a frame of a videostream and here includes a vehicle 104*d* and people 104*a-c*. The resolution of the first image is the resolution as captured by the image acquisition device 100.

In step S104, the control unit 3 scales the first resolution image 110 to a second resolution image 112 with lower resolution than the resolution of the first resolution image 110. Scaling the first resolution image 110 to the second resolution image 112 may be performed by downscaling the first resolution image 110 to the second resolution image 112. The resolution of the second resolution image 112 may be scaled down by a factor selected in the range of 4-25, such as for example, 4, 9, 16, in the total number of pixels.

In step S106, the second resolution image is analyzed by the control unit 3 to determine a first probability that a detected object of a predetermined type is present in an area 111 of the first resolution image. Thus, an analysis is performed on the second resolution image 112 to establish an area 111' in the second resolution image 112 where detected objects may be present. The corresponding area 111 is determined or found in the original first resolution image 110.

The analysis is preferably performed in a neural network of a predetermined size and resolution. The size and/or resolution of a neural network correspond to the size and resolution of the images it has been trained on. Further, the resolution of the second image 112 depends on the size and/or resolution of the neural network used for analyzing the second resolution image. For example, the second resolution should be kept higher than the resolution of the neural network. Since the size of the first resolution images are substantially larger than the size of the neural network, the neural network may have difficulties analyzing the images fast enough. To alleviate this the first resolution image is downscaled to a smaller resolution according to the present disclosure which allow the neural network to operate fast to perform the analysis. Thus, by performing the downscaling and subsequent cropping discussed above, the overall operation of the analysis can be performed more efficiently.

If the first probability is below a first threshold and above or equal to a second threshold, the area 111 including the detected object 104*b-c* in the first resolution image is cropped in step S108. The first and second probabilities are adapted so that a probability exceeding or being equal to the first threshold indicate that a detected object is of the predetermined type and probabilities below the second threshold indicate that a detected object is not of the predetermined type. For example, an object of predetermined type may include objects that should be masked such as people 104*a-c* and license plates of vehicles 104*d*.

In some cases, the crop image 111 is downscaled similar to the downscaling in step S104, for example if a recursive process is applied as will be described further below. However, it is generally not strictly necessary that the cropped image is downscaled.

If the first probability exceeds or is equal to the first threshold, an indication that the detected object is of the predetermined type may be provided by the control unit 3 in step S109. In case of applying the method to masking, if the detected object is an object that should be masked such as people or license plates of vehicles, then a subsequent step may be to provide privacy masking of the detected object 104c-b in the image 110.

In subsequent step S110 the cropped image 111 is analyzed by the control unit 3 to determine a second probability that the detected object 104b is of the predetermined type. If the second probability exceeds or is equal to the first threshold, the control unit 3 provides an indication that the detected object 104b is of the predetermined type in step S112.

Figure 4A:
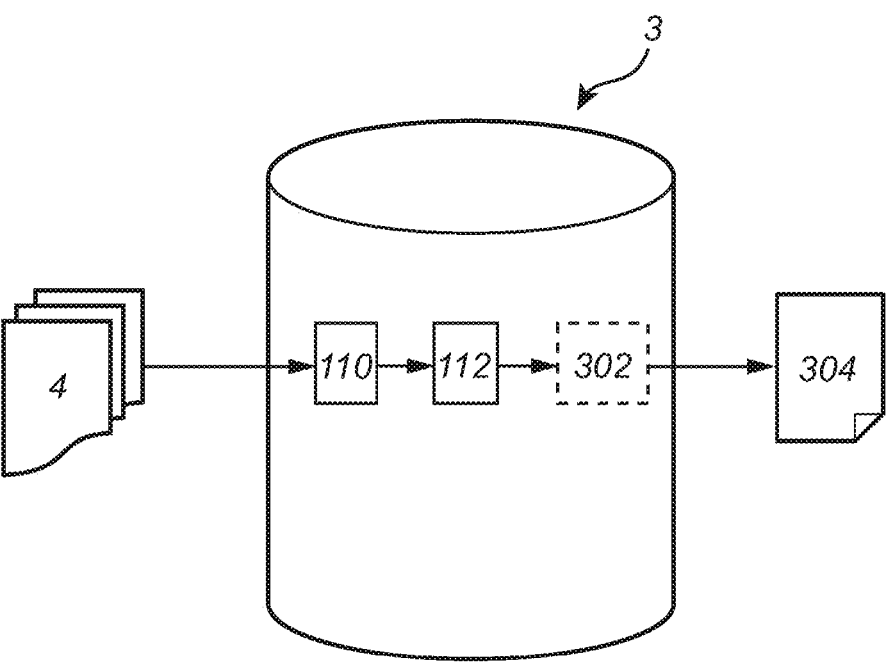
FIG. 4A conceptually illustrates a control unit operating a neural network according to embodiments of the disclosure.

As schematically indicated in FIG. 4A, the control unit 3 which receives, or acquires the videostream 4 from the image capturing module 2, scales the first resolution image 110 to be analyzed and provides the scaled second resolution image 112 to a neural network 302. The steps of analyzing the second resolution 112 image and analyzing the cropped image 111 is performed in the neural network 302. The control unit 3 provides an indication that a detected object 104b is of the predetermined type in the form of a data signal 304.

Figure 4B:
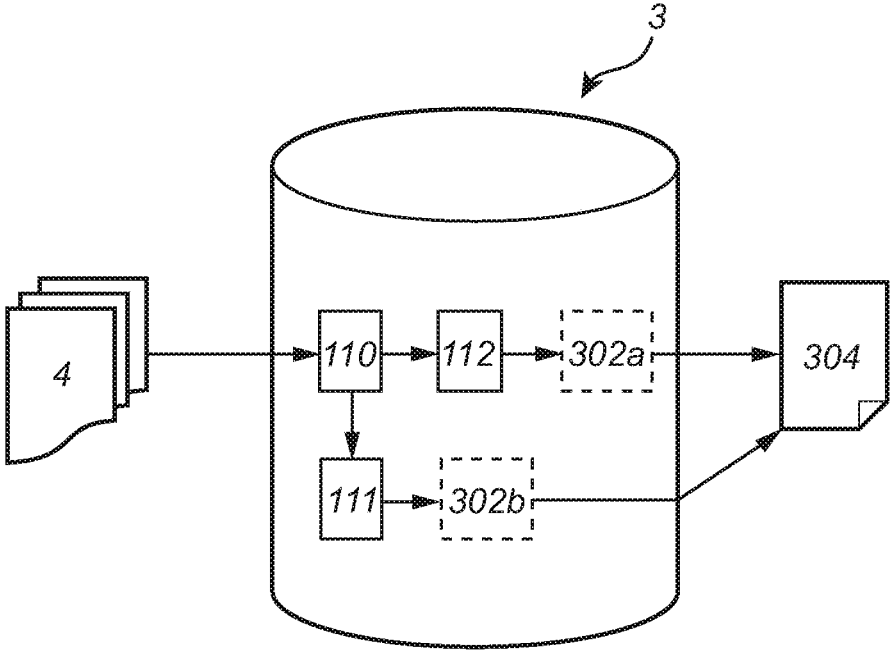
FIG. 4B conceptually illustrates a control unit operating two neural networks according to embodiments of the disclosure.

Turning to FIG. 4B which conceptually illustrates an alternative to the embodiment of FIG. 4A, the step of analyzing the second resolution image 112 is performed in a first neural network 302a and the step of analyzing the cropped image 111 is performed in a second neural network 302b. In this way, the second resolution image may be of higher resolution than if only a single neural network is used since the processing capacity is split between two networks 302a and 302b.

Figure 5:
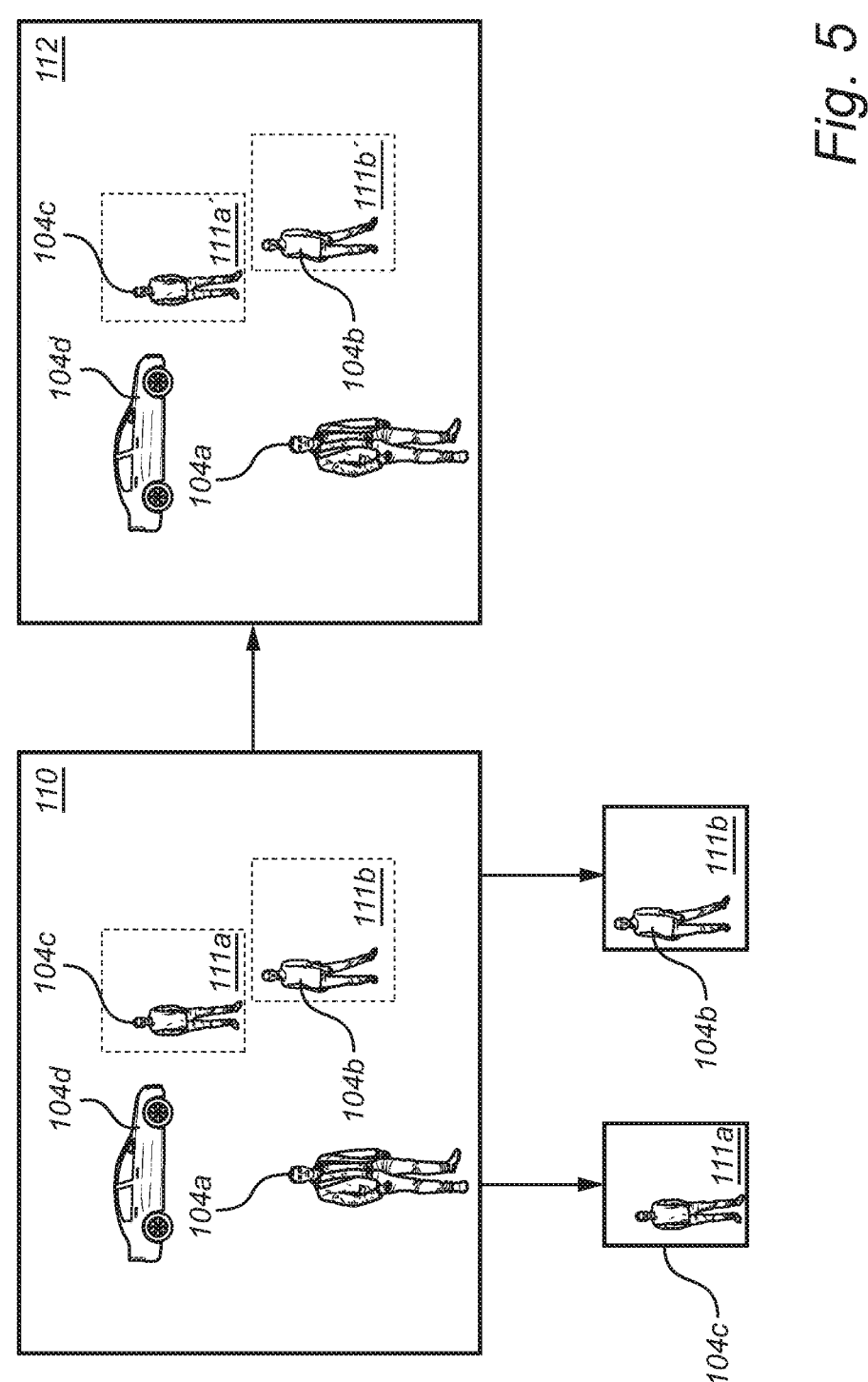
FIG. 5 conceptually illustrates an image cropping process for object detection according to embodiments of the disclosure.

Now with reference to FIG. 5, it may occur that objects 104c and 104b of the predetermined type are detected with some probability in more than one area 111a and 111b of the first resolution image 110 based on the analysis of the second resolution image 112 in which corresponding areas 111a' and 111b' are detected. In such case, more than one respective area 111a and 111b is cropped in the first resolution image 110 and analyzed in the neural network or in more than one neural network. However, if possible, one area may be cropped that includes both objects 104c and 104b and processed in a recursive manner, as will be discussed further below.

According to some embodiments, the method is recursively performed as is exemplified by the steps of the flow-chart in FIG. 6 that will be discussed in conjunction with FIG. 3. The cropping in step S108 is preferably performed so that the cropped image includes all or as many as possible of the detected objects. In this example, the cropped image 111 includes detected objects 104b and 104c. If the image size of the cropped image 111 is too large for the neural network, the cropped image 111 is downscaled to a reduced resolution cropped image prior to analysis. Thus, provided a cropped image 111, the cropped image 111 may firstly be downscaled as discussed in step S104. Subsequently, the cropped image 111, or the reduced resolution cropped image is analyzed in step S602 to determine the second, or a further probability that a detected object 104c of the predetermined type is present in an area 115' of the cropped image 111. Thus, here cropped image 111, which may be a scaled cropped image 111 is analyzed in the neural network similar to the second resolution image 112 in step S106 in FIG. 2. Thus, an analysis is performed on the cropped image 111 to establish an area 115' in the cropped image 111 where detected objects 104c may be present.

If the further probability is below the first threshold and above or equal to the second threshold, cropping the area 115' of the detected object 104c in the cropped image 111 to form a further cropped image 115 in step S604.

If a predetermined condition is not fulfilled, the process recursively again analyzes the further cropped image to determine a still further probability that the detected object is of the predetermined type in step S602. If the probability exceeds or is equal to the first threshold, providing an indication that the detected object 104c is of the predetermined type in step S109. In such case, the detected object 104c may be masked in the first resolution image 110.

The object 104b may have been concluded in the cropped image to be of the predetermined type, whereby it is not included in the cropped image 115.

Figure 6:
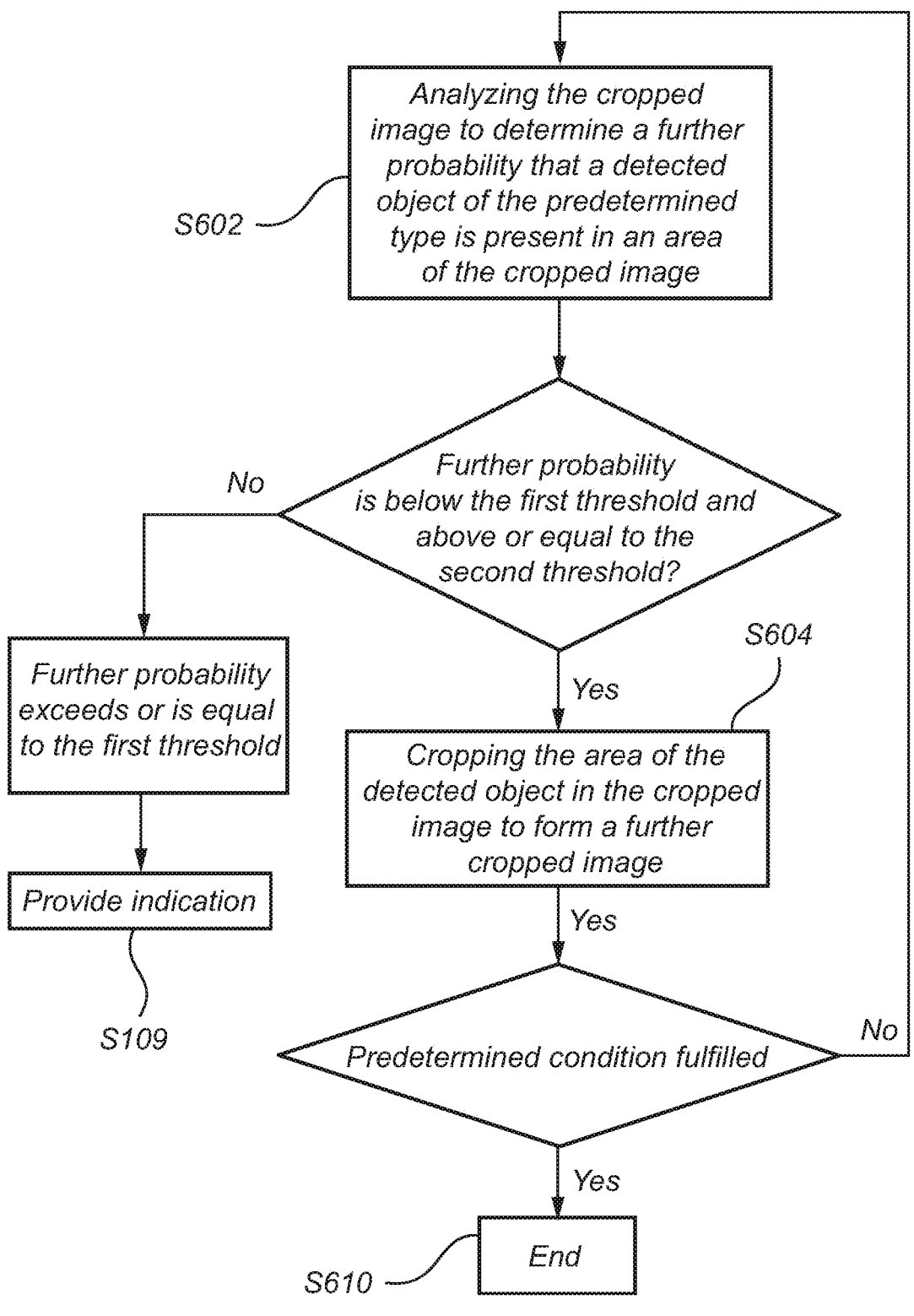
FIG. 6 is a flow-chart of method steps according to embodiments of the disclosure.

The steps of the flow-chart in FIG. 6 are recursively performed until at least one of the following predetermined conditions are fulfilled: the further probability is below the second threshold or exceeds or is equal to the first threshold; a number of iterations exceeds or is equal to a predetermined number, and a resolution of the further cropped image is below a predetermined resolution.

For example, if the further probability exceeds or is equal to the first threshold, then the neural network has concluded that the object 104c is detected with sufficiently high probability whereby further analysis is not necessary and an indication thereof is provided in step S109. Similarly, if the further probability is below the second threshold, the neural network has concluded that the object is not of the predetermined type whereby further analysis is not necessary. In this case, it can for example be concluded that masking is not necessary.

Further, the iterations may proceed until the resolution of the further cropped image is below a predetermined resolution set by the resolution of the neural network.

If the predetermined condition is fulfilled, the method ends in step S610.

Figure 7:
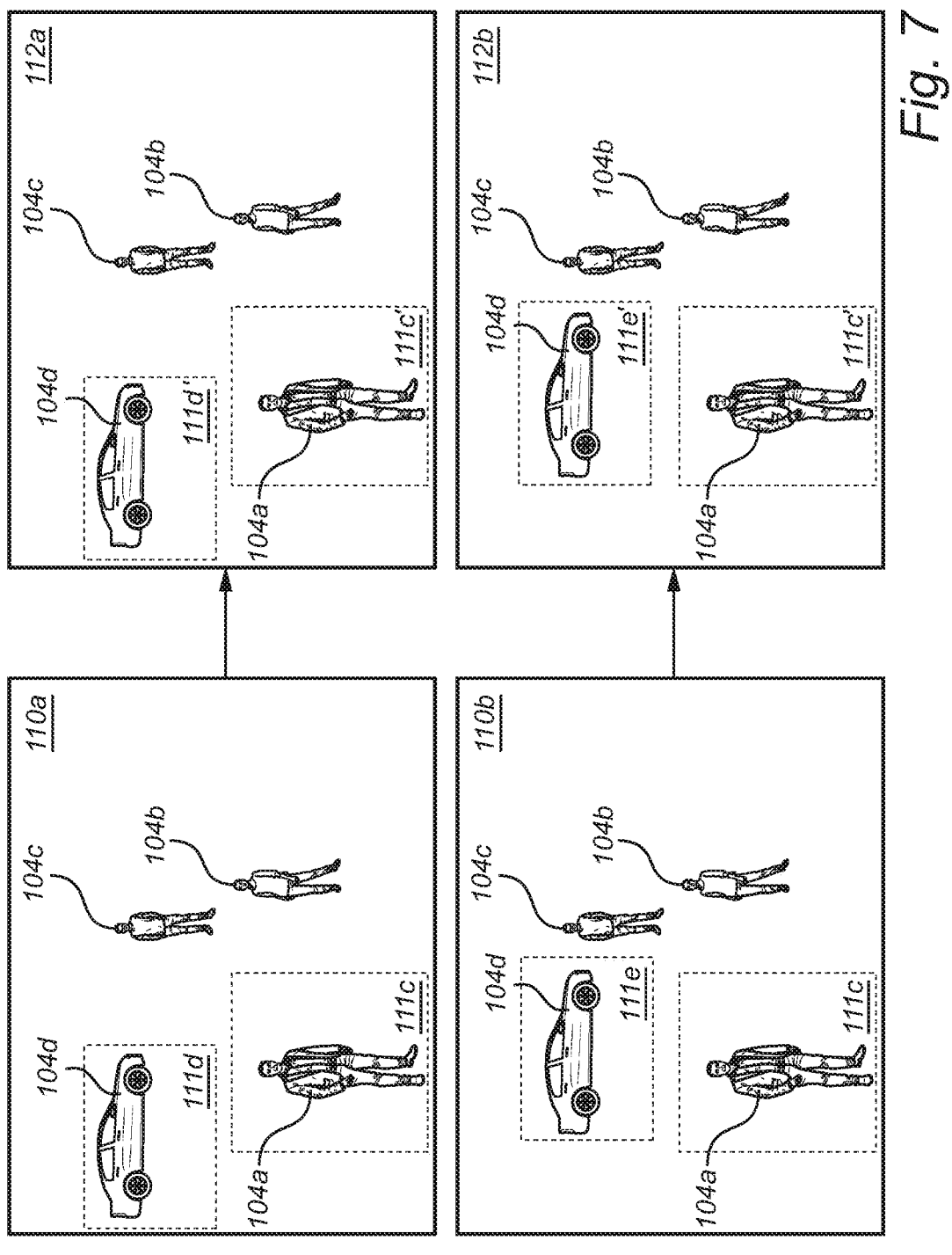
FIG. 7 conceptually illustrates image cropping in the presence of moving objects according to embodiments of the disclosure.
Figure 8:
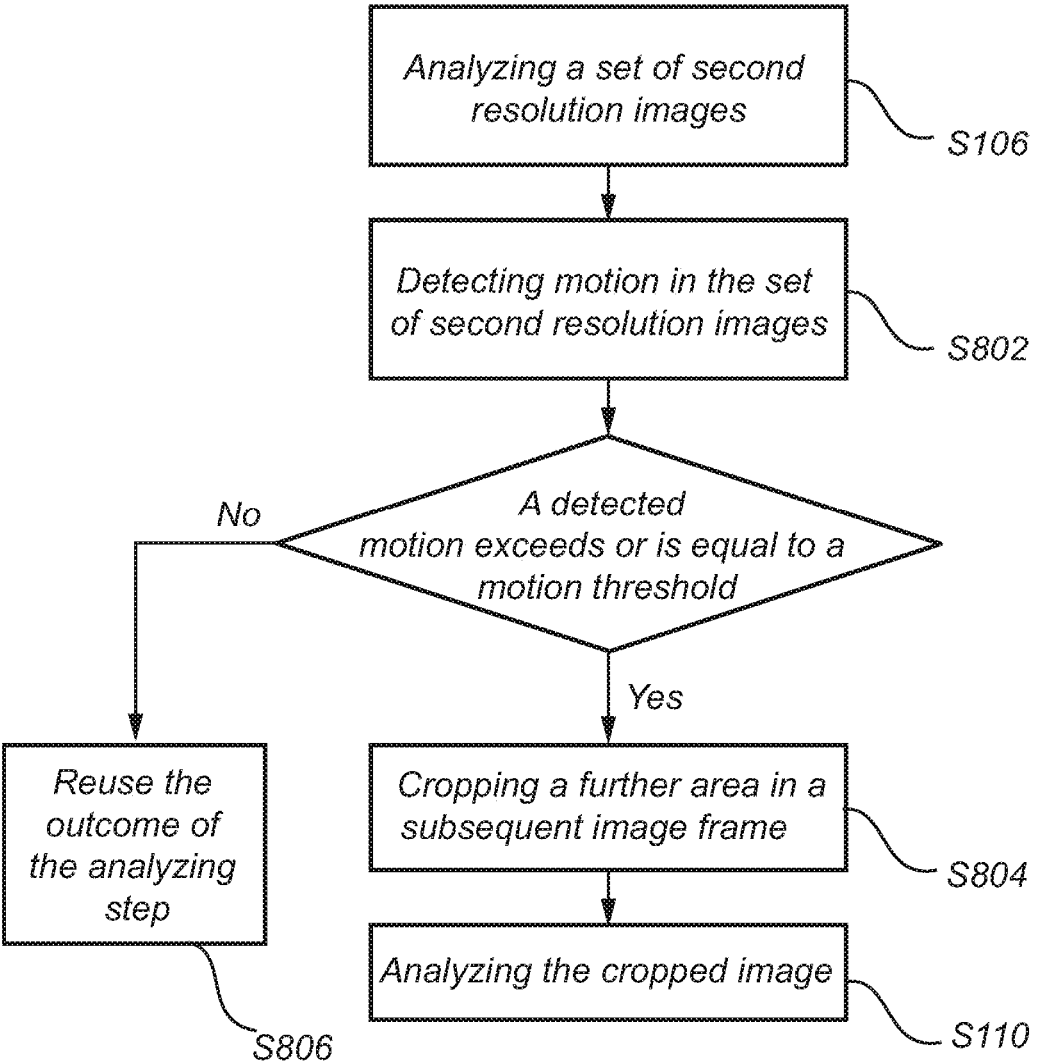
FIG. 8 is a flow-chart of method steps according to embodiments of the disclosure.

FIG. 7 conceptually illustrates two first resolution image frames 110a and 110b, and corresponding scaled second resolution images 112a and 112b, and FIG. 8 is a flow-chart of method steps according to embodiments of the disclosure.

The second resolution images 112a and 112b are analyzed in step S106 as discussed in relation to FIG. 2.

Subsequently, step S802 includes detecting motion in the second resolution images 112a-b. This can be performed by comparing a second resolution image frame 112a with a subsequent second resolution image frame 112b and detect and differences between them that may indicate motion of objects. For example, a pixel-wise comparison may be performed to compare color variations between frames 112a and 112b that may indicate motion. Here, the vehicle 104d is moving and has for example moved between frames 110a/112a and 110b/112b whereas the person 104a has not moved.

If a detected motion exceeds or is equal to a motion threshold, the same area is cropped in a subsequent image frame in step S804. In this example, since motion is detected in the cropped area 111d' in second resolution image frame 112a, a further area 111e including the moving object 104d is cropped in the second image frame 110b as in the first image frame 110a. The further area 111e corresponds to the area 111e' of the moving object 104d in the second resolution image 112b of the second image frame 110b. Accordingly, since motion of some relatively intense degree is detected, it is important to continuously crop a further area 111e and repeat the analyzing step S110 on the cropped area 111e.

However, if the detected motion is below the motion threshold in a first image frame 112a, a repeated cropping is not required. Instead, the outcome of the analyzing step in the first frame 112a on the same cropped area is reused in a subsequent image frame 112b. This saves computational power since the cropping and analyzing steps S108 and S110 need not be repeated unless changes in corresponding areas of the scene 1 are detected. For example, no motion is detected in the area 111c' between the second resolution image frames 112a and 112b. Therefore, the analysis for detecting objects performed in the prior step on corresponding areas 111c in image frame 110 is reused, e.g., concluding that a person 104a is still present in image frame 110b.

Preferably, the method is performed at a rate substantially corresponding to the frame rate of a captured videostream including the first resolution image. The neural network or networks are configured so that object detection can be on each frame with at most one frame delay.

The method described herein is a computer-implemented method.

The control unit comprising processing circuitry, the processing circuitry being configured to cause the control unit to perform the steps of the methods described herein.

A computer program product is further provided including a computer readable storage medium storing the computer program. The computer readable storage medium may for example be non-transitory, and be provided as e.g. a hard disk drive (HDD), solid state drive (SDD), USB flash drive, SD card, CD/DVD, and/or as any other storage medium capable of non-transitory storage of data.

The computer program comprises computer code which, when run on processing circuitry of a controller causes the control unit to: obtain first resolution image acquired by an image acquisition device; scale the first resolution image to a second resolution image with lower resolution than the resolution of the first resolution image; analyze the second resolution image to determine a first probability that a detected object of a predetermined type is present in an area of the first resolution image, if the first probability is below a first threshold and above or equal to a second threshold, crop the area including the detected object in the first resolution image, where probabilities exceeding or equal to the first threshold indicate that a detected object is of the predetermined type and probabilities below the second threshold indicate that a detected object is not of the pre-determined type, analyze the cropped image to determine a second probability that the detected object is of the prede-termined type, and if the second probability exceeds or is equal to the first threshold, provide an indication that the detected object is of the predetermined type.

The control unit includes a microprocessor, microcontrol unit, programmable digital signal processor or another pro-grammable device. The control unit may also, or instead, include an application specific integrated circuit, a program-mable gate array or programmable array logic, a program-mable logic device, or a digital signal processor. Where the control unit includes a programmable device such as the microprocessor, microcontrol unit or programmable digital signal processor mentioned above, the processor may further include computer executable code that controls operation of the programmable device.

The control functionality of the present disclosure may be implemented using existing computer processors, or by a special purpose computer processor for an appropriate sys-tem, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-execut-able instructions or data structures and which can be accessed by a general purpose or special purpose computer or other machine with a processor. When information is transferred or provided over a network or another commu-nications connection (either hardwired, wireless, or a com-bination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose com-puter, special purpose computer, or special purpose process-ing machines to perform a certain function or group of functions.

Although the figures may show a sequence the order of the steps may differ from what is depicted. Also, two or more steps may be performed concurrently or with partial con-currence. Such variation will depend on the software and hardware systems chosen and on designer choice. All such variations are within the scope of the disclosure. Likewise, software implementations could be accomplished with stan-dard programming techniques with rule-based logic and other logic to accomplish the various connection steps, processing steps, comparison steps and decision steps. Addi-tionally, even though the disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed disclosure, from a study of the drawings, the disclosure, and the appended claims. Further-more, in the claims, the word "comprising" does not exclude other elements or steps, and the indefinite article "a" or "an" does not exclude a plurality.

The invention claimed is:

1. A computer-implemented method for object detection in an image acquired by a camera of a surveillance system, comprising the steps of:

obtaining first resolution image acquired by the camera;

scaling the first resolution image to a second resolution image with lower resolution than the resolution of the first resolution image;

analyzing the second resolution image to determine a first probability that a detected object of a predetermined type is present in an area of the first resolution image, where a predetermined type is an object that should be masked;

if the first probability is below a first threshold and above or equal to a second threshold, cropping the area including the detected object in the first resolution image, where probabilities exceeding or equal to the first threshold indicate that a detected object is of the predetermined type and probabilities below the second threshold indicate that a detected object is not of the predetermined type;

analyzing the cropped image to determine a second probability that the detected object is of the predetermined type;

if the second probability exceeds or is equal to the first threshold, providing an indication that the detected object is of the predetermined type that should be masked, and if the second probability is below the first threshold and above or equal to the second threshold:

(a) analyzing the cropped image to determine a further probability that a detected object of the predetermined type is present in an area of the cropped image;

(b) if the further probability is below the first threshold and above or equal to the second threshold, cropping the area of the detected object in the cropped image to form a further cropped image;

(c) analyzing the further cropped image to determine a still further probability that the detected object is of the predetermined type; and (d) if the still further probability exceeds or is equal to the first threshold, providing an indication that the detected object is of the predetermined type, wherein the steps (a)-(d) are recursively performed until a predetermined condition is fulfilled.

2. The method according to claim 1, wherein analyzing the second resolution image and analyzing the cropped image are performed in a neural network.

3. The method according to claim 1, wherein analyzing the second resolution image is performed in a first neural network and analyzing the cropped image is performed in a second neural network.

4. The method according to claim 1, wherein the steps (a)-(d) are recursively performed until at least one of the following conditions is fulfilled:

the further probability in step (b) is below the second threshold or exceeds or is equal to the first threshold;

a predetermined number of iterations; and if a resolution of the further cropped image is below a predetermined resolution.

5. The method according to claim 1, wherein analyzing the first resolution image comprises to determine probabilities that detected objects of the predetermined type is present in more than one area, where more than one respective area is cropped in the first resolution image and analyzed.

6. The method according to claim 1, further comprising: analyzing a set of second resolution images;

detecting motion in the set of second resolution images; and if the detected motion exceeds or is equal to a motion threshold, cropping a further area in a subsequent image frame, analyzing the cropped image, and, if the second probability exceeds or is equal to the first threshold, providing an indication that the detected object is of the predetermined type.

7. The method according to claim 6, wherein if the detected motion is below the motion threshold in a first image frame, reusing the outcome of the analyzing step to determine the second probability in a first frame on the same cropped area in a subsequent image frame.

8. The method according to claim 1, wherein if the first probability exceeds or is equal to the first threshold, providing an indication that the detected object is of the predetermined type.

9. The method according to claim 1, wherein the resolution of the first resolution image is as captured by the image capturing device.

10. The method according to claim 1, wherein the resolution of the second resolution image depends on a size of a neural network used for analyzing the second resolution image.

11. The method according to claim 1, wherein the method is performed at a rate substantially corresponding to the frame rate of a captured video stream including the first resolution image.

12. A processing circuitry comprising one or more processors and memory storing instructions for object detection in an image acquired by a camera, the processing circuitry is configured to:

obtain first resolution image acquired by the camera;

scale the first resolution image to a second resolution image with lower resolution than the resolution of the first resolution image;

analyze the second resolution image to determine a first probability that a detected object of a predetermined type is present in an area of the first resolution image, where a predetermined type is an object that should be masked;

if the first probability is below a first threshold and above or equal to a second threshold, crop the area including the detected object in the first resolution image, where probabilities exceeding or equal to the first threshold indicate that a detected object is of the predetermined type and probabilities below the second threshold indicate that a detected object is not of the predetermined type;

analyze the cropped image to determine a second probability that the detected object is of the predetermined type;

if the second probability exceeds or is equal to the first threshold, provide an indication that the detected object is of the predetermined type that should be masked, and if the second probability is below the first threshold and above or equal to the second threshold:

(a) analyzing the cropped image to determine a further probability that a detected object of the predetermined type is present in an area of the cropped image;

(b) if the further probability is below the first threshold and above or equal to the second threshold, cropping the area of the detected object in the cropped image to form a further cropped image;

(c) analyzing the further cropped image to determine a still further probability that the detected object is of the predetermined type; and (d) if the still further probability exceeds or is equal to the first threshold, providing an indication that the detected object is of the predetermined type, wherein the steps (a)-(d) are recursively performed until a predetermined condition is fulfilled.

13. A system comprising: a camera for capturing images of a scene including objects; and a processing circuitry comprising one or more processors and memory storing instructions for object detection in said images, the processing circuitry is configured to:

obtain first resolution image acquired by the camera;

scale the first resolution image to a second resolution image with lower resolution than the resolution of the first resolution image;

analyze the second resolution image to determine a first probability that a detected object of a predetermined type is present in an area of the first resolution image, where a predetermined type is an object that should be masked;

if the first probability is below a first threshold and above or equal to a second threshold, crop the area including the detected object in the first resolution image, where probabilities exceeding or equal to the first threshold indicate that a detected object is of the predetermined type and probabilities below the second threshold indicate that a detected object is not of the predetermined type;

analyze the cropped image to determine a second probability that the detected object is of the predetermined type;

if the second probability exceeds or is equal to the first threshold, provide an indication that the detected object is of the predetermined type that should be masked, if the second probability is below the first threshold and above or equal to the second threshold:

(a) analyzing the cropped image to determine a further probability that a detected object of the predetermined type is present in an area of the cropped image;

(b) if the further probability is below the first threshold and above or equal to the second threshold, cropping the area of the detected object in the cropped image to form a further cropped image;

(c) analyzing the further cropped image to determine a still further probability that the detected object is of the predetermined type; and (d) if the still further probability exceeds or is equal to the first threshold, providing an indication that the detected object is of the predetermined type, wherein the steps (a)-(d) are recursively performed until a predetermined condition is fulfilled.

14. A non-transitory computer-readable storage medium having stored thereon a computer program for object detection in an image, the computer program comprising computer code which, when run on a processing circuitry comprising one or more processors causes the processing circuitry to:

obtain first resolution image acquired by a camera of a surveillance system;

scale the first resolution image to a second resolution image with lower resolution than the resolution of the first resolution image;

analyze the second resolution image to determine a first probability that a detected object of a predetermined type is present in an area of the first resolution image, where a predetermined type is an object that should be masked;

if the first probability is below a first threshold and above or equal to a second threshold, crop the area including the detected object in the first resolution image, where probabilities exceeding or equal to the first threshold indicate that a detected object is of the predetermined type and probabilities below the second threshold indicate that a detected object is not of the predetermined type;

analyze the cropped image to determine a second probability that the detected object is of the predetermined type;

if the second probability exceeds or is equal to the first threshold, provide an indication that the detected object is of the predetermined type that should be masked, if the second probability is below the first threshold and above or equal to the second threshold:

(a) analyzing the cropped image to determine a further probability that a detected object of the predetermined type is present in an area of the cropped image;

(b) if the further probability is below the first threshold and above or equal to the second threshold, cropping the area of the detected object in the cropped image to form a further cropped image;

(c) analyzing the further cropped image to determine a still further probability that the detected object is of the predetermined type; and (d) if the still further probability exceeds or is equal to the first threshold, providing an indication that the detected object is of the predetermined type, wherein the steps (a)-(d) are recursively performed until a predetermined condition is fulfilled.

* * * * *